(12) United States Patent
Bauer et al.

(10) Patent No.: US 9,529,343 B2
(45) Date of Patent: Dec. 27, 2016

(54) DIALOGUE SYSTEM AND METHOD FOR EXAMINING MACHINING PROCESSES

(71) Applicant: TRUMPF Werkzeugmaschinen GmbH + Co. KG, Ditzingen (DE)

(72) Inventors: Klaus Bauer, Ditzingen (DE); Gerhard Hammann, Korntal-Muenchingen (DE); Hans-Peter Bock, Tamm (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 923 days.

(21) Appl. No.: 13/724,189

(22) Filed: Dec. 21, 2012

(65) Prior Publication Data

US 2013/0184839 A1   Jul. 18, 2013

Related U.S. Application Data

(63) Continuation of application No. PCT/DE2011/060821, filed on Jun. 28, 2011.

(30) Foreign Application Priority Data

Jun. 30, 2010   (DE) .................. 10 2010 030 691

(51) Int. Cl.
  *G05B 15/02* (2006.01)
  *G05B 19/409* (2006.01)

(52) U.S. Cl.
  CPC ............ *G05B 15/02* (2013.01); *G05B 19/409* (2013.01); *G05B 2219/32007* (2013.01); *G05B 2219/36118* (2013.01)

(58) Field of Classification Search
  CPC ..................................................... G05B 15/12

(Continued)

(56) References Cited

U.S. PATENT DOCUMENTS 4,891,766 A * 1/1990 Derr .................. G06N 5/022
  706/11
4,967,337 A * 10/1990 English .............. G05B 13/0265
  700/79

(Continued)

FOREIGN PATENT DOCUMENTS

EP  2169491 A1  3/2010
WO  WO03036398 A1  5/2003
WO  WO2010013065 A2  2/2010

OTHER PUBLICATIONS

Notification of Transmittal of the Translation of the International Preliminary Report on Patentability for corresponding PCT Application No. PCT/EP2011/060821, mailed Jan. 17, 2013, 7 pages.

(Continued)

*Primary Examiner* — Robert Fennema
*Assistant Examiner* — Sivalingam Sivanesan
(74) *Attorney, Agent, or Firm* — Fish & Richardson P.C.

(57) ABSTRACT

A dialog system for examining a processing operation carried out on a machine tool and establishing a proposal for improving at least one quality feature of a subsequent processing operation, the dialog system having input means to predetermine the quality feature to be improved and a proposal module which, by accessing stored expert knowledge, can establish at least one proposal for improving the quality feature. In some implementations, the proposal module is operable to read data established by one or more of a machine tool sensor system and image data of a processed workpiece together with associated material and processing data to provide the proposal.

19 Claims, 6 Drawing Sheets

(58) Field of Classification Search
USPC .......................................................... 700/83
See application file for complete search history.

(56) References Cited

U.S. PATENT DOCUMENTS

| | | | |
|---|---|---|---|
| 5,127,005 A | 6/1992 | Oda et al. | |
| 6,345,205 B1 | 2/2002 | Inamasu et al. | |
| 2002/0194032 A1* | 12/2002 | Mankopf | G06F 19/324 |
| | | | 705/3 |
| 2004/0030514 A1* | 2/2004 | Popp | A61F 13/15772 |
| | | | 702/81 |
| 2004/0246840 A1* | 12/2004 | Plagemann | G05B 19/408 |
| | | | 369/47.23 |
| 2005/0267826 A1* | 12/2005 | Levy | B25J 9/1689 |
| | | | 705/34 |
| 2007/0106416 A1* | 5/2007 | Griffiths | B23K 26/032 |
| | | | 700/166 |

OTHER PUBLICATIONS

Bird, Shawn, "Object-Oriented Expert System Architectures for Manufacturing Quality Management", 8287, Journal of Manufacturing Systems, 11 (1992), No. 1, Dearborn, MI, US, 12 pages.
Dvorak et al., "Process Monitoring and Diagnosis", IEEE Expert, Jun. 6, 1991, No. 3, Los Alamitos, CA, US, 8 pages.
Fox et al., "Techniques for Sensor-Based Diagnosis", Westinghouse Electric Corporation, May 14, 1983, Pittsburgh, PA, US, 18 pages.
International Search Report from corresponding PCT Application No. PCT/EP2011/060821, mailed Oct. 31, 2011, 6 pages.

\* cited by examiner

DIALOGUE SYSTEM AND METHOD FOR EXAMINING MACHINING PROCESSES

CROSS REFERENCE TO RELATED APPLICATIONS

This application is a continuation of and claims priority under 35 U.S.C. §120 to PCT Application No. PCT/EP2011/060821 filed on Jun. 28, 2011, which claims priority to German Application No. 10 2010 030 691.6, filed on Jun. 30, 2010. The contents of both of these priority applications are hereby incorporated by reference in their entireties.

TECHNICAL FIELD

The present disclosure is directed to dialogue systems, and more particularly to a dialogue system for use in industrial workpiece production.

BACKGROUND

Dialogue systems are used in all fields of technology and are distinguished in particular by the ability to be able to communicate with an operator. For this purpose, a dialogue system can include at least one input/output means and a processor or a central processing unit which implements the software required for the specific configuration of the dialogue system.

A dialogue system of the generic type or a method of the generic type for examination of a processing operation which is carried out on a machine tool are known, for example, from the patent specification U.S. Pat. No. 6,345, 205 B1. Using the dialogue system, which is configured as an auxiliary system for a laser processing machine, it is possible to establish an improvement proposal in the form of modified process parameters for a workpiece processing operation planned on the laser processing machine. With respect to a workpiece processing operation which has already been carried out, an operator predetermines at least one quality feature, for example, the extent of the burr formation at a laser cut which has been produced, which the operator wishes to improve. With reference to operator inputs and stored process parameters of the workpiece processing operation that has been carried out, the dialogue system calculates new process parameters for carrying out an optimized workpiece processing operation. The dialogue system uses stored expert knowledge which includes, for example, empirically established relationships of process parameters and quality features.

Such known dialogue systems can have the disadvantage that improvement proposals are established primarily on the basis of subjective evaluations or estimations of the operator. The possibilities for finding a proposal with the conventional dialogue system can therefore be limited by the capabilities and possibilities of the operator and by the extent of the stored expert knowledge.

SUMMARY

Implementations of the present disclosure are directed to a dialogue system (or "technology assistant") for the examination of a processing operation which is carried out on a machine tool in order to establish a proposal for improving at least one quality feature of a subsequent processing operation, the dialogue system having input means through which an operator can predetermine the quality feature to be improved, and the dialogue system having a proposal module which, by accessing stored expert knowledge, can establish at least one proposal for improving the quality feature.

Implementations of the present disclosure are further directed to a method for the examination of a processing operation which is carried out on a machine tool in order to establish a proposal for improving at least one quality feature of a subsequent processing operation, in which an operator predetermines at least one quality feature for a dialogue system, whereupon the dialogue system establishes at least one proposal for improving the quality feature using stored expert knowledge.

Implementations of the present disclosure provide a dialogue system and method for the examination of a processing operation which are distinguished by expanded possibilities for seeking the proposal.

In the context of the present disclosure, the proposal module of the dialogue system is constructed in such a manner that, in order to establish a proposal, the proposal module reads data and/or image data (photographs) of a processed workpiece established by means of a machine tool sensor system together with associated material and processing data. The database on which an improvement proposal can be established is consequently extended by objective data which are established by means of sensors of the machine tool or which constitute image data of the processed workpiece together with their associated material and processing data. Owing to the expanded database, in the search for an improvement proposal, it is possible to take into account, for example, machine-related effects which cannot be recognized by an operator. For example, inadequate adjustments, an incorrect focal point adjustment of a laser beam, defective components, and/or a contaminated lens of a laser cutting head, can be established. Furthermore, using a sensor for material recognition, it is possible to detect differences between the composition of the material actually used and the material composition on the basis of which the process parameters were selected. Additional causes of errors can thus be discovered or prevented.

Furthermore, there is produced the advantage that not only indirect information, which is based on the subjective estimation of the operator with respect to the quality features of a processing result, is used to examine the processing operation. Instead, objective information of the processing operation carried out on the machine tool may also have a direct influence. Owing to the use of objective sensor and image data, the capabilities of the operator in finding a proposal becomes less significant. The dialogue system according to implementations of the present disclosure can therefore also be used with same degree of success by less proficient operators.

In the context of the present disclosure, the dialogue system provides an improvement proposal at the instigation of an operator. It thus differs, for example, from a system for process monitoring which, in the event of a malfunction, automatically outputs a warning during a processing operation and optionally at the same time a proposal for overcoming the malfunction. The catalyst for an operator to use the dialogue system, however, may also be a malfunction during a processing operation. That is to say, the dialogue system may at least partially also constitute a diagnosis system which, owing to symptoms predetermined by an operator (inadequate quality features) and using data established by the machine tool sensor system or recorded image data, can provide a proposal in order to overcome the malfunction.

However, a dialogue system according to the present disclosure is particularly provided to examine an at least substantially malfunction-free processing operation in order to generate a proposal by means of which a subsequent processing operation can be improved or optimized.

For example, possible causes for lacks of quality or error sources may, taken by themselves, still be below alarm thresholds defined by a process monitoring system but, taken as a whole, may lead to a processing operation of adequate quality not being able to be ensured with standard process parameters. The dialogue system is thereby in a position to determine whether an improvement of a predetermined quality feature is possible or advantageous, for example, by means of simple adaptation of the process parameters, such as, for example, the processing speed, the laser energy, the cutting gas pressure or the laser frequency, etcetera.

An operator predetermines for the dialogue system at least one quality feature with respect to a processing operation which is carried out. The term quality feature is intended to be understood to include on the one hand features and properties of the result or product of the processing operation. These include by way of example a cutting burr, workpiece discoloration, marks and scratches on the workpiece surface, the dimensional accuracy or also the evenness of a workpiece. However, in addition to product features, process properties also constitute quality features of the processing operation. These include in particular the processing speed, emissions during the workpiece processing operation, the process reliability, the energy consumption, etc.

A dialogue system in accordance with implementations of the present disclosure may be constructed in such a manner that the dialogue system not only examines and improves the portion of a processing cycle of a machine tool in which a tool actually acts on a workpiece. Additionally, the processing operation also includes in the context of the present disclosure, for example, the handling of the workpiece before and after the actual workpiece processing operation and other accompanying processes. In the case of the processing operation to be examined, it does not have to be a processing operation in which a complete processing cycle was completed. The processing operation to be examined may also include only a portion of a processing cycle, for example, only the supply of the workpiece, the introduction of an individual laser cut, etc. In particular, the processing operation to be examined may also be a processing operation which is carried out on a machine tool by way of a test.

The improvement proposals provided by the dialogue system according to implementations of the present disclosure—as already mentioned—constitute, for example, a set of process parameters or resulting process parameters for the subsequent processing operations that is changed with respect to a standard set. Alternatively or in addition, however, it is also possible to consider other types of improvement proposals which the dialogue system can provide. For example, the dialogue system may propose maintenance or conversion measures on the machine tool or the implementation of analyses, tests, etc.

In order to establish an improvement proposal, the dialogue system reads sensor data, such as measurement values or also evaluations of measurement values of the sensors, and/or image data of a processed workpiece together with associated material and processing data. In the context of present disclosure, therefore, the terms sensors or sensor systems are intended to include not only the measuring sensors but also the associated electronic evaluation system and software of the sensors, etc. A dialogue system according to implementations of the present disclosure is produced when the data of at least one sensor can be read by the dialogue system in order to establish an improvement proposal. However, the greater the amount of sensor data the dialogue system is able to read from sensors, and the greater the number of sensors of the machine tool sensor system, the greater is the database for seeking a proposal and consequently the durability of the proposal. The sensor system of modern machine tools generally has a plurality of sensors which are primarily used for process regulation and process monitoring.

Particularly advantageous for seeking the proposal are data from sensors which directly observe the operating cycle, in particular the actual workpiece processing operation, such as, for example, an optical sensor for monitoring the perforation during laser cutting or a sensor for monitoring seams during laser welding. So that the dialogue system can subsequently read the sensor data established during the processing operation to be examined when seeking a proposal, these data are stored and the dialogue system can access the stored sensor data where necessary.

The image data of the processed workpiece are preferably images of a camera with a sufficiently great image quality, the processing location of the workpiece, such as, for example, a cutting edge, advantageously being photographed from various viewing angles.

Further, the dialogue system according to implementations of the present disclosure is distinguished in that the subjective estimations of the operator can be quantified by means of objective sensor and/or image data. It is thereby possible to partially dispense with time-consuming interrogations of the operator. Using the dialogue system, the operator arrives at an improvement proposal in the smallest possible number of targeted steps.

In some implementations, the dialogue system is configured, in addition to predetermining the quality feature to be improved, to request additional operator inputs, if necessary, and to process them together with the sensor data established by the machine tool sensor system and/or with the image data in order to establish the proposal. Possible operator inputs may include both the input of objective values and the input of subjective evaluations. In particular the operator may be asked to select values, variants and evaluations. In this manner, the operator is able to include his wishes and capabilities—in so far as they exist—in the proposal search process.

The dialogue system may also initiate a processing operation and/or a measurement by the machine tool sensor system. For example, the dialogue system can independently interrogate current sensor data and consequently, for example, current status data of components of the machine tool, the dialogue system being connected to the respective sensor for this purpose. In particular it is possible, at the instigation of the dialogue system, for another processing operation to be carried out in which specific sensor data are established and stored which are not established or at least not stored during a standard processing operation. Furthermore, taking into account all available data, the dialogue system may initiate test processing operations which are adapted to the situation.

In some implementations, the dialogue system may automatically start a processing operation which is optimized in accordance with the proposal. To this end, the dialogue system may communicate with at least one control unit of the machine tool. When the dialogue system has found the most likely causes with respect to the quality features to be improved, it is advantageous for it also to be able to implement the proposal for improvement or optimization itself. Alternatively, however, the dialogue system may also initiate a processing operation or a sensor measurement by means of a proposal to the operator.

Particularly pleasant operation of the dialogue system is achieved when the dialogue system has a mask generator, which can in particular produce masks for the input request and/or for the output of established proposals. The graphic configuration of the input/output means of the dialogue system with masks enables the production of a particularly intuitive operating concept for the dialogue system. The dialogue system is in particular constructed in such a manner that the operator can be guided by the masks from the description of the problem, through seeking a proposal, to the implementation of a proposal.

In some implementations, the stored expert knowledge has a tree-like data structure with hierarchical decision nodes which the solution module can access in order to establish a proposal. When seeking a proposal, consequently, the dialogue system successively processes decision nodes. At the respective decision node, the dialogue system must in each case fetch only the information, for example, by means of an input request or reading of sensor data, which is required for a decision at the relevant decision node. Owing to the tree-like data structure with hierarchical decision nodes, therefore, the interrogation and reading of information which is insignificant for seeking a proposal are prevented. An implementation of a dialogue system is thus produced which is distinguished by particularly selective establishment of a proposal.

The expert knowledge which has been stored can include a data bank which has a plurality of individual data elements which in particular each define a decision node. Owing to the use of a data bank, the dialogue system according to the invention can use proven data bank technologies and modules for the administration of the expert knowledge. Thus, the expert knowledge may, for example, be stored in the data bank in an encrypted manner, only the dialogue system being able to freely access the expert knowledge if necessary by means of a corresponding data bank module. For example, a relational data bank or an object data bank may be provided. An XML data bank has been found to be particularly advantageous in practice.

The data bank structure having a plurality of individual data elements which each define a decision node is distinguished by a high level of transparency. This is particularly advantageous when the stored expert knowledge can be modified by an operator, that is to say, the establishment of the proposal is carried out by the dialogue system using a generic decision tree. In this instance, decision nodes can be supplemented or inserted by an operator, for example, using an implemented data bank module, only individual data elements being supplemented and modified.

Advantageously, the mask generator is further adapted to the data bank structure in such a manner that, when the decision tree is changed, no changes are required in the mask generator but it can instead automatically produce suitable input or output masks, for example, on the display of a data processing system. Consequently, new findings of the expert knowledge can be inserted by means of modifications to the decision tree without changes having to be carried out at the interface between the operator and dialogue system. For this purpose, various mask templates are determined in the mask generator, for example, how an input request must appear for the operator when one or more values have to be input at a decision node, how exemplary data or previously selected data must be displayed for the operator for selection, how proposals are intended to be displayed, etc. In order to generate a mask, the mask generator must determine only the required mask template and fill it with information from the data element which is associated with the relevant decision node.

The processing of the sensor and/or image data by means of the solution module can be carried out in such a manner that the proposal module makes a decision at a decision node at least based on the sensor and/or the image data (sensor system/workpiece data decision node). Alternatively or in addition, decision nodes are defined in such a manner that the proposal module at the respective decision node makes a decision at least based on an operator input (operator input decision node) or based on data from a control program of the processing operation which is carried out (control program data decision node). Other types of decision nodes are further conceivable.

The interaction of all three mentioned types of decision node when establishing a proposal is a particular strength of the dialogue system according to implementations of the present disclosure, which can consequently access a wide data and knowledge base in order to ultimately determine a resilient improvement proposal. In the case of a particularly preferred dialogue system, the stored expert knowledge therefore has a tree-like data structure which defines at least one path for establishing a proposal which has at least one sensor system/workpiece data decision node, at least one operator input decision node and/or at least one control program data decision node.

The dialogue system according to implementations of the present disclosure can be part of a control unit of the machine tool. Through integration of the dialogue system in the control unit, there is produced a dialogue system that has access to a plurality of data, information and communication possibilities which are beneficial to an effective error analysis.

It is particularly advantageous for the control unit, owing to a proposal of the dialogue system for a subsequent processing operation, to be able to carry out an automatic determination or adaptation of at least one process parameter of the subsequent processing operation. The dialogue system can preferably use a stored control program for the subsequent processing operation for this purpose and change at least one process parameter there.

Further, another aspect of the present disclosure relates to a computer program product which has encoding means which are adapted to form a dialogue system according to implementations of the present disclosure when the computer program product is operated on a data processing system. Possible computer program products include by way of example CD ROM discs, USB sticks, hard drive plug-ins, etc. However, computer program products in the context of this application are also intended to be understood to include downloadable software products or the like.

Of course, the features which are mentioned above and which are set out in greater detail below are used in accordance with the present disclosure individually or together in any combination. In particular, the stored expert knowledge which has a tree-like data structure with hierarchical decision nodes, which a solution module can use to establish a proposal, even independently of a solution module which is constructed to read data established by a machine tool sensor system in order to establish a proposal, may be provided according to the invention in a dialogue system, but also, for example, in a system for process monitoring.

Other advantages and advantageous configurations of the subject-matter of the present disclosure can be taken from the description, the drawings and the claims. The implementations illustrated and described are not intended to be understood to be a definitive listing but are instead examples in order to describe the invention.

DETAILED DESCRIPTION

The control of machine tools is carried out by means of numerical control devices which are generally divided into three control units, an MMC operating system (Man Machine Communication), as a data input and display unit, an SPC control unit (Stored Program Control) and an NC (Numerical Control) control unit. Data and control commands are input via the MMC operating system, transmitted to the NC control unit and decoded there. The data and control commands are further processed separately in accordance with geometric and technological data (NC control unit) and switch commands (SPC control unit). The NC and SPC control units transmit the current machine status for display to the MMC control unit.

Figure 1:
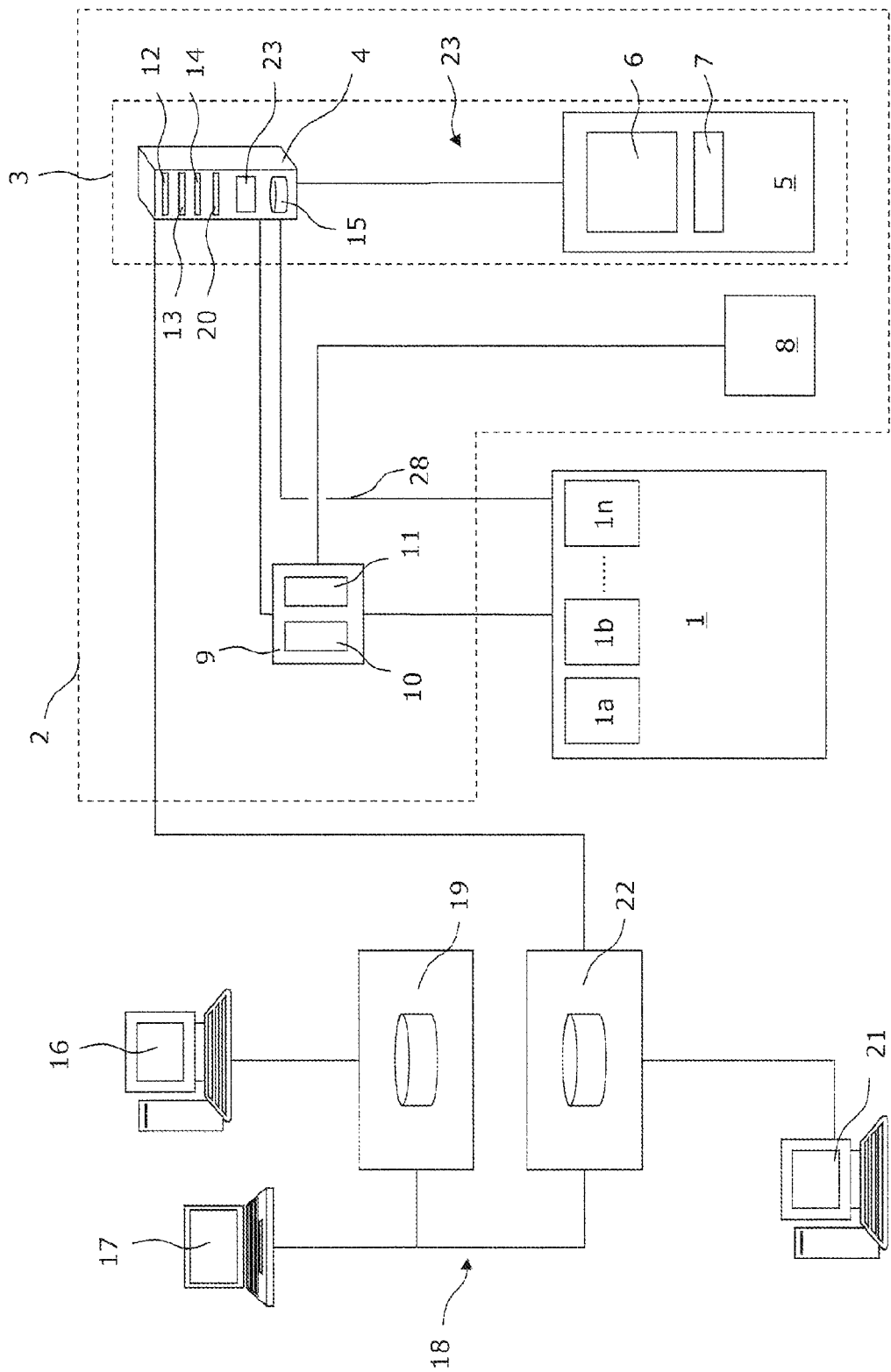
FIG. 1 shows a structure of a production system having a machine tool, a control device for the machine tool and a programming system.

FIG. 1 shows a machine tool 1 which is controlled using a numerical control device 2. The machine tool 1 contains sensors 1a, . . . 1n which generally monitor a processing operation. Examples of this are sensors for determining the nozzle/workpiece spacing, the degree of contamination of a lens, the focal point in a laser machine tool, sensors for measuring the force in punching/bending machines, sensors for determining the bending angle in bending machines or sensors for detection or prediction of collisions or potential collisions of the machine with the workpiece.

In terms of hardware, the control device 2 includes an MMC operating system 3 having a control computer 4 which is constructed as an industrial PC and an operating device 5 having a screen 6 as a display unit and an input unit 7 which is constructed, for example, as a keyboard, mouse or touch panel. Furthermore, the control device 2 includes a machine control panel 8 for manual operation of the machine tool 1, safety-relevant operations in particular being carried out, and an NCU sub-assembly 9 (Numerical Control Unit) with an integrated NC control unit 10 and SPC control unit 11. The NC and SPC control units 10, 11 may also be constructed as separate sub-assemblies.

In terms of software, the control device 2 includes operating software 12 for controlling the machine tool 1, software modules 13 for task administration, tool administration and pallet administration, a program administration system 14 for administration of control programs and a data store 15 in which standard process parameters for the control programs are stored.

The term "control program" includes in addition to the NC program all the technological data which are removed from the NC program into external data stores. Sensor data of the machine tool sensors 1a, . . . 1n may also be read and stored in this or an additional data store 15 via the NCU sub-assembly 9. Furthermore, additional applications, such as, for example, a construction system, a programming system or a combined construction and programming system, may be installed on the control computer 4.

The production of a component on the machine tool 1 involves a constructor, a programmer and a machine operator in activities, some of which can be carried out by one or two persons together. The construction of the component is carried out using a construction system 16 (CAD system) or a combined construction and programming system 17 (CAD/CAM system), the abbreviations CAD and CAM standing for Computer Aided Design and Computer Aided Manufacturing.

Completed construction drawings are stored on a common CAD data store 19 which is provided for this purpose in a network 18 and which the programmers can access as necessary.

The machine tool 1 is controlled by means of control programs which are produced by means of a programming system or manually on the operating device 5 of the MMC operating system 3. Programming systems know basic and specific NC functions and know which technological data are required and which rules apply to the processing. Consequently, they can automatically define the processing and generate a control program.

In the implementation illustrated in FIG. 1, in addition to the combined construction and programming system 17, another combined construction and programming system 20 is installed on the control computer 4 and a programming system 21 (CAM system) is installed in the network 18. The programming systems 17, 20, 21 are connected to a CAM data store 22 which the programmers and machine operators may access. The programmer stores the completed control programs in the CAM data store 22. The machine operator can access the CAM data store 22 and import the control programs from the CAM data store 22 into the program administration system 14 of the control computer 4.

During the programming operation, the programmer determines how a component will be processed. He determines which tools are used, in which sequence the processing operation is carried out and which process parameters apply, for example, to the laser power and advance speed. The programming systems 17, 20, 22 assist the programmer in finding suitable process parameters and processing strategies for his processing task. The information relating to suitable process parameters and processing strategies are contained in so-called technology tables and control systems which define the data store 15.

Depending on the material type, the material thickness and the processing method, suitable process parameters for all the relevant variables which enable a process-reliable processing operation are stored in a technology table. If necessary, technology tables are defined in accordance with other parameters. These include in the case of laser cutting, for example, the contour size, which is differentiated as small, medium and large, and the machine type on which the processing operation is intended to be carried out.

In technology tables, a differentiation is made between general, generally write-protected technology tables of the machine manufacturer and customer-specific technology tables. General technology tables are established by the machine manufacturer with great complexity and delivered to the customers together with the numerical control device 2 of the machine tool 1. Customer-specific technology tables can be created and modified by a programmer or machine operator. In customer-specific technology tables, there are stored process parameters which are adapted to the processing tasks of a specific customer. The process parameters which are stored in the general technology tables are referred to in the context of this application as "standard process parameters".

In order to establish the standard process parameters, machine manufacturers carry out countless parameter variations and evaluate the processing results. The decision as to which process parameters are stored in the technology table is dependent inter alia on the peripheral conditions. If a processing operation is intended to be carried out to the highest possible level of processing quality, different process parameters are produced than in the case of a processing operation at the fastest possible speed. The process parameters which a machine manufacturer sets out in general technology tables generally constitute a compromise between various peripheral conditions, such as quality, process reliability and speed. The programmers and machine operators generally do not know the peripheral conditions under which the machine manufacturer has established the process parameters of the general technology tables.

The properties of the material used have a significant influence on the process reliability of the processing operation and the quality of the processing result. This may lead to process parameters which have provided satisfactory processing results with a specific material giving unsatisfactory processing results after a change of the material supplier or with another material load so that adaptation of the process parameters is required.

In particular in order to assist an operator with such an adaptation, a dialogue system (also referred to as a "technology assistant") 23 is provided for the examination of a processing operation carried out on the machine tool 1. In the implementation shown, the dialogue system 23 is part of the control device 2. The operating device 5 of the control device 2 therefore acts as an input/output means of the dialogue system 23, with the screen 6 as a display unit and the input unit 7. The central processing unit of the control computer 4, on which there are operated encoding means 24 by means of which the dialogue system 23 is trained, is used as a central processing unit of the dialogue system 23.

For example, the encoding means 24 for implementing the dialogue system 23 may be installed in the control device 2 as a software module on the control computer 4 or may be part of the operating software 12 from the beginning. Alternatively, the encoding means 24 may be stored on a separate sub-assembly or a separate plug-in of the control computer 4. However, it is also conceivable for the dialogue system 23 to be operated as part of one of the programming systems 17, 20, 21. Finally, the dialogue system 23 may also be operated as an independent system on a separate data processing system.

Figure 2:
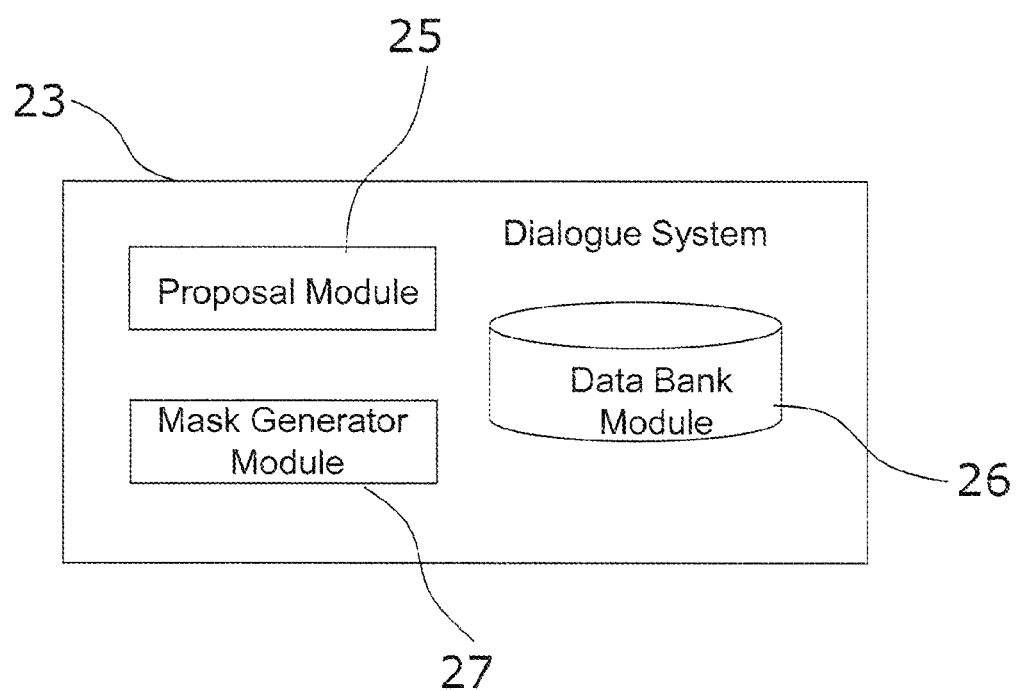
FIG. 2 shows a structure of a dialogue system for the examination of a processing operation which is carried out on the machine tool.

FIG. 2 shows the software-related structure of the dialogue system 23. Accordingly, the dialogue system 23 has a proposal module 25, a data bank module 26 and a mask generator module 27. In addition, additional modules which are not illustrated may be provided for a great variety of purposes.

The central module of the dialogue system 23 is the proposal module 25 which, by accessing stored expert knowledge, can establish at least one proposal for improving a quality feature predetermined by an operator using the input unit 7. In order to establish a proposal, the proposal module 25 reads data established by the machine tool sensor system ($1a, \ldots 1n$) if necessary. The sensor data include measurement values of the sensors ($1a, \ldots 1n$) or data which are based on continued evaluation of the sensor measurement values.

In order to read the sensor data, the dialogue system 23 may on the one hand communicate directly with sensors ($1a, \ldots 1n$) by means of data lines 28 (FIG. 1). On the other hand, however, the dialogue system 23 may also use storage means, in this instance the data store 15, in which data of the sensors ($1a, \ldots 1n$) which in particular were established in the processing operation to be examined are stored. Alternatively or in addition, it is also conceivable for the dialogue system 23 also to be able to read the sensor data indirectly via an NCU data line.

Furthermore, the dialogue system 23 may request operator inputs in order to establish an improvement proposal, if necessary, and to process them together with the data established by the machine tool sensor system ($1a, \ldots 1n$). Finally, the dialogue system 23 is capable of initiating specific sensor measurements or a specific processing operation in order to provide information.

When seeking a proposal, the proposal module 25 operates an implemented algorithm, which in particular determines access to the stored expert knowledge. The expert knowledge which the dialogue system 23 is able to access is stored in one or more storage means which is/are distributed over the network 18. The expert knowledge also includes, for example, the technology tables.

In particular, however, the expert knowledge has an XML data bank which includes a plurality of individual data elements. The data elements define a tree-like data structure with hierarchical decision nodes, a decision node being defined in each case by a decision node data element.

In detail, there is/are stored in a decision node data element at least one question or decision criterion for deciding between at least two different references to other decision data elements, which in turn each define a decision node with references, etc. Furthermore, the data bank contains data elements which define improvement proposals. If the proposal module is referred to a data element having an improvement proposal, the proposal seeking operation is ended. The dialogue system can transmit the proposal to the operator, guide him in the optimization or problem solving or automatically introduce adaptations, etc., itself.

Decision nodes having various types of questions or decision criteria are provided. Some decision nodes are defined in such a manner that the proposal module 25 at the decision node makes a decision based on data established by the machine tool sensor system ($1a, \ldots 1n$) (sensor data decision nodes). Other decision nodes are defined in such a manner that the proposal module at the decision node makes a decision based on an operator input (operator input decision node) or based on data from a control program of the processing operation carried out (control program data decision node). In particular in this manner, there are defined paths for establishing a proposal which have a sensor system data decision node, an operator input decision node and/or a control program data decision node.

When processing a sensor data decision node, the proposal module is caused to read sensor data and, with reference to the sensor data, determine a reference to a following data element in the decision path. The same applies with control program data decision nodes.

In the case of operator input decision nodes, an input request is initiated by the proposal module. For this purpose, the mask generator module 27 is provided and forms a mask generator which can produce masks for the input request. Furthermore, the mask generator can if necessary also produce masks to output established improvement proposals or generally to inform and support the operator.

At the mask generator side, an individual mask is not stored for each individual possible display. There are instead defined a small number of mask templates which must simply be filled in with information from the data element which is currently being processed. The implementation of such a mask generator is particularly advantageous when the dialogue system 23 is configured as a learning system, that is to say, the expert knowledge can be changed, for example, by an operator.

In the case of the dialogue system 23 shown, there is used to change the expert knowledge stored in the data bank the data bank module 26 which is constructed in the manner of conventional data bank administration software. Using the data bank module 26, data elements can be supplemented or inserted, in particular other decision nodes or even proposals from an operator can be introduced as a result.

Furthermore, the data bank module 26 also generally co-ordinates access of the proposal module 25 to the data bank so that proven data bank technologies can be used. For example, the expert knowledge stored in the data bank is thus encrypted and consequently the expert knowledge is not freely accessible. Since the tree-like data structure or the decision tree contains extensive expert knowledge about operating processes, it is advantageous to encrypt these data using suitable measures and thus to protect this expert knowledge from undesirable access. Access is therefore given only to the components of the machine tool 1 which require it, in particular only the dialogue system 23 via the data bank module 26.

Examples of quality features of a processing operation which the operator can predetermine for the dialogue system 23 in order to achieve improvements include, inter alia, the cutting edge quality in laser machines, which can be evaluated, inter alia, by means of burr formation and direction of the burr, formation of marks or discolorations at the cutting edge, and the formation of scratches on metal sheets or pipes in pipe processing machines, punching machines or combination punching/laser machines, but also undesirable deformations of a workpiece, for example, owing to collisions of the machine tool 1 with the workpiece. Such collisions may, for example, occur in bending machines between a bent workpiece portion and a tool or a tool retention member or between a punching or laser head of the machine tool 1 and workpiece metal sheets with shaped portions or metal workpiece sheets or pipes with laser-cut portions when the cutout portion does not fall correctly from the pipe or the metal sheet.

If it is determined, for example, by an operator, that the cutting quality of a laser cut is inadequate, the operator starts the dialogue system 23. In a first step, the quality feature "cutting quality" is predetermined by the operator via the input unit 7, for example, by selecting this quality feature from a list of quality features offered by the dialogue system 23. Subsequently, the proposal module 25 of the dialogue system 23 uses the corresponding data element of the XML data bank in order to improve the cutting quality.

The inadequacies of the cutting quality will first be set out in specific terms below. Depending on the machine tool 1, the data element in question could have, for example, a first processing instruction, according to which the reading of a sensor ($1a$, ... $1n$) of the machine tool 1, such as, for example, the reading of the images of a CCD camera is initiated, in order to fill the attributes of the data element with the required additional information. Alternatively or in addition, an operator input mask can be produced in order to initiate a required operator input.

The two following attributes to be filled in could be associated with the element in this example: 1. Burr formation at the top (yes/no) and 2. Burr formation at the bottom (yes/no). If these two attributes of the element are filled in by operator input or reading of sensors ($1a$, ... $1n$), reference is made to another data element by another processing instruction. The following data element may be considered, in which the burr formation is described in greater detail by additional attributes, such as, for example, the height of the burr, continuous or only sporadically formed burr, etc., or, if there has been no burr formation, an element whose attributes are filled with information with regard to discolorations or formation of marks during laser processing. The dialogue system 23 consequently serves to support the operator in a guided manner when describing the problem.

After processing a plurality of data elements which define hierarchical decision nodes, the proposal module finally reaches a data element having an improvement proposal. The improvement proposal is, for example, output or automatically implemented. For example, it is possible to carry out for the subsequent processing operation a focal point adjustment which is automatic or which is guided by an operator.

Figure 3:
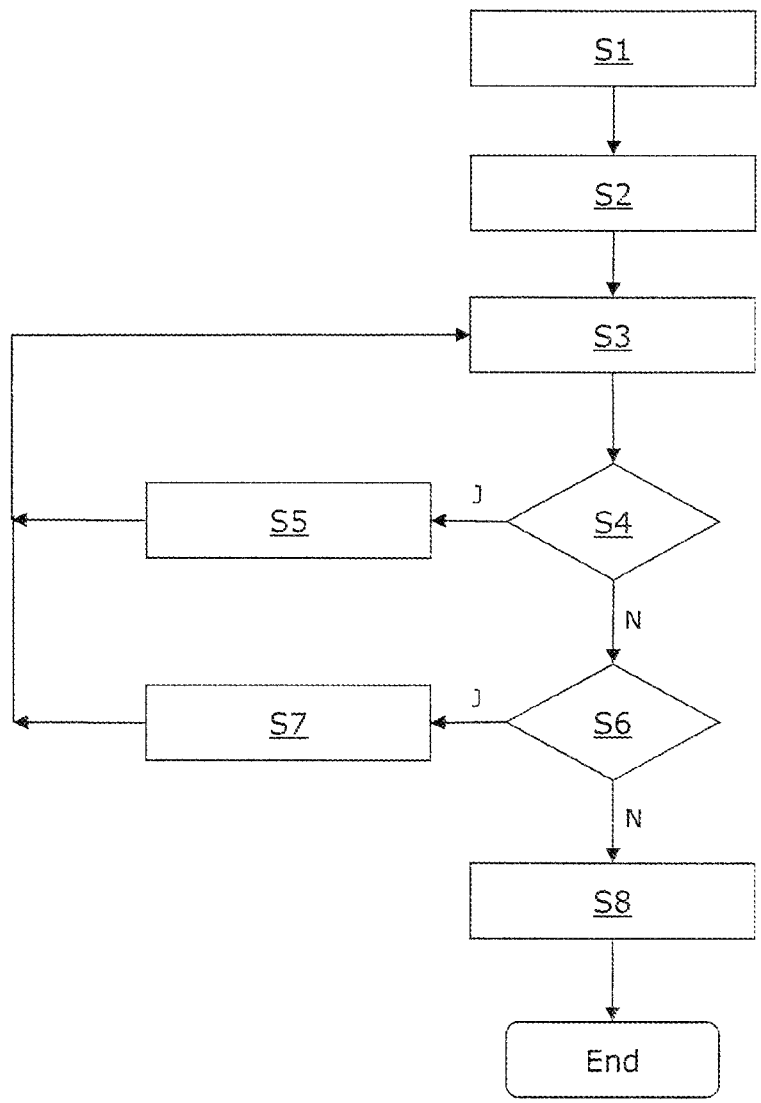
FIG. 3 is a flow chart of a method for the examination of a processing operation which is carried out on the machine tool.

FIG. 3 shows an implementation of a method according to the invention for the examination of a processing operation which is carried out on a machine tool 1 by the dialogue system 23.

In a step S1, the operator opens an input mask on the MMC operating unit 3 in order to input one or more quality features which have been determined by him and which are intended to be improved. Subsequently, in a step S2, the data from the machine tool sensor system $1a$, ... $1n$ relevant to the examination and subsequent optimization of the quality features input in S1 are read into the dialogue system 23. In a step S3, the data input so far by the operator and the machine tool sensor system $1a$, ... $1n$ are processed and compared with known causes of inadequacies or with known possibilities for optimization of the quality feature from the expert knowledge to be improved. In a step S4, it is verified whether further inputs of the operator are necessary or helpful for the examination or optimization of the processing operation.

Should this be the case and if the operator affirms the additional input of information (J in S4), in a step S5, the additional operator inputs are read in. Otherwise (N in S4), it is verified in a step S6 whether additional information from the machine tool sensor system $1a$, ... $1n$ must be read or produced by means of a test processing operation in order to examine or optimize the processing operation. Should this be the case and if the operator affirms (J in S6), in a step S7, the data from the machine tool sensor system $1a$, ... $1n$ are read into the dialogue system 23, optionally in the context of a test processing operation. If no other data from the machine tool sensor system $1a$, ... $1n$ are read in (N in S6), in a step S8, possibilities for improvement of the processing operation are proposed or automatically implemented, whereby the method according to the invention is ended.

Of course, the data structure which is constructed as a generic decision tree may also be used in other inventions. In particular, a system for process monitoring is conceivable and can determine, for example, by means of the reading of machine tool sensors $1a, \ldots 1n$ that malfunctions are occurring or quality features are inadequate. Automatically, that is to say, without operator predetermination, the system for process monitoring establishes using the data structure with hierarchical decision nodes which is stored in particular in a data bank, which is constructed in a similar manner to the data bank of the dialogue system 23, at least one possibility for eliminating the malfunction or the inadequacy in a subsequent processing operation.

Figure 4A:
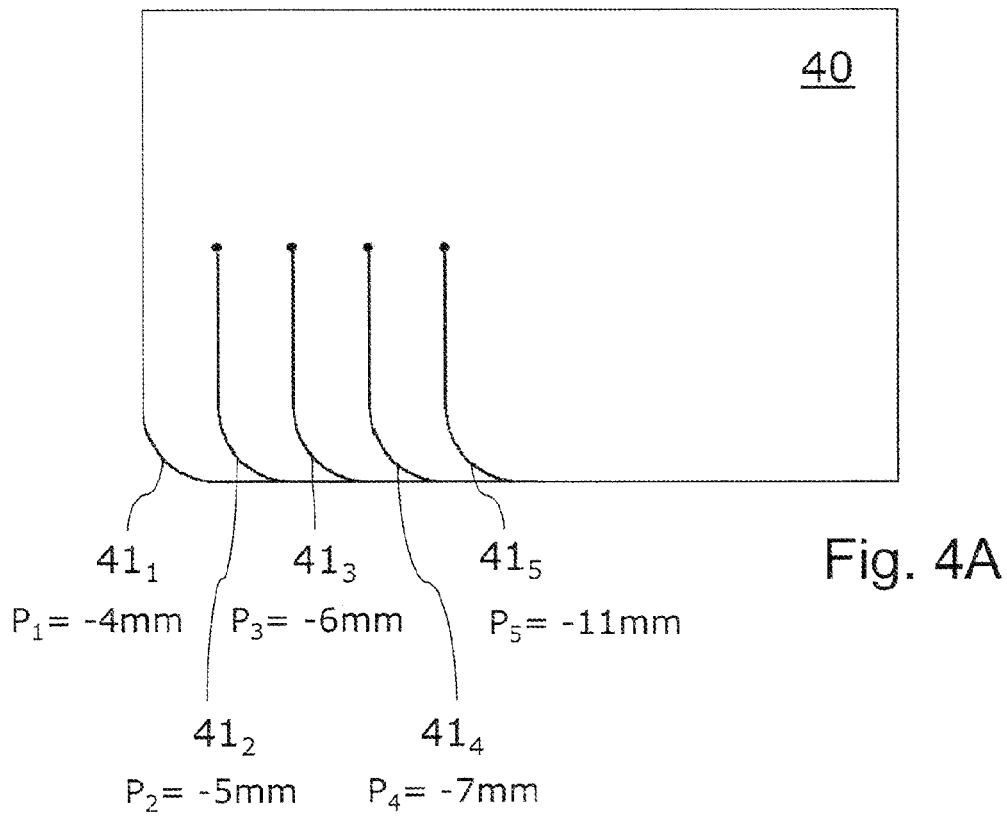
FIGS. 4a and 4b show a workpiece in the form of a test cut metal sheet having a plurality of cut edges which are each cut with different cutting parameters.
Figure 4B:
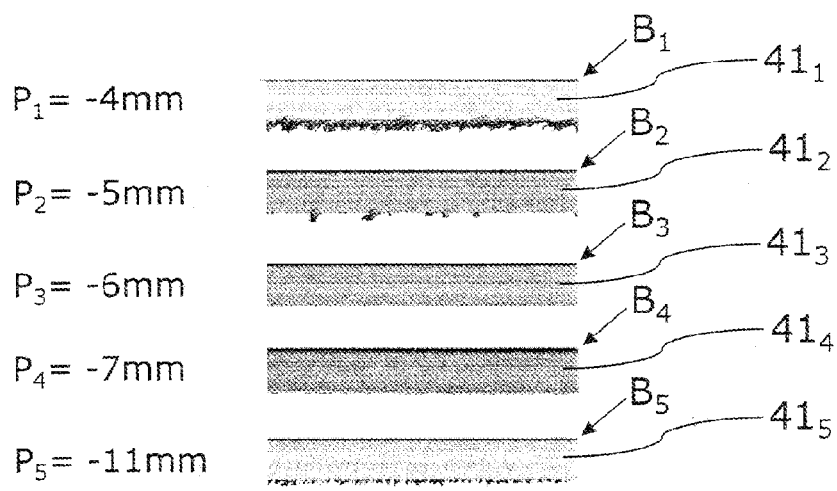

FIG. 4a shows a test cut metal sheet 40 having five cut edges $41_1$ to $41_5$ which are each cut by laser with different cutting parameters P1 to P5, and FIG. 4b shows photos $B_1$ to $B_5$ of the cut edges $41_1$ to $41_5$ which are different in this instance owing to different burr formation and in which as a cutting parameter the focal point of the laser beam was varied relative to the upper side of the metal sheet in each case and was −4 mm, −5 mm, −6 mm, −7 mm and −11 mm.

In order to optimize the cutting parameters without expert knowledge in situ, steps as shown in FIG. 5 are carried out.

Figure 5A:
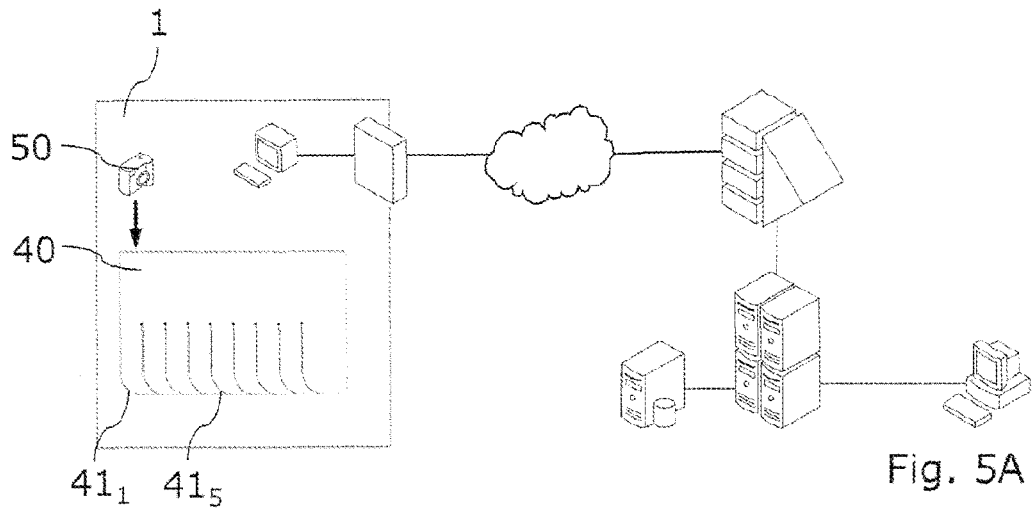
FIGS. 5a to 5e show the individual method steps of a method according to implementations of the present disclosure for cutting parameter optimization using a central expert system which is incorporated in the telepresence portal.

On the machine tool 1 which is constructed in this instance as a laser cutting machine, the test cut metal sheet 40 illustrated in FIG. 4 with its different cutting edges $41_1$ to $41_5$ is cut in accordance with the various cutting parameters P1 to P5. The cutting edges $41_1$ to $41_5$ of the test cut metal sheet 40 are photographed from various viewing angles with a camera 50 having sufficiently high image quality (FIG. 5a).

Figure 5B:
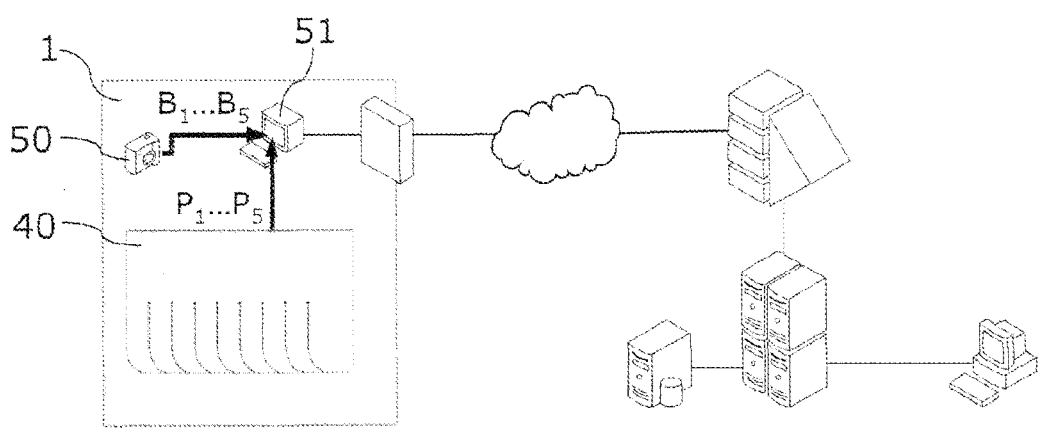

The associated cutting parameters P1 to P5 (that is to say, the different focal points) and the material properties (that is to say, for example, high-grade steel with a metal sheet thickness of 8 mm) are added to the images $B_1$ to $B_5$ of the cutting edges $41_1$ to $41_5$ by the machine operating processor 51 as meta data (FIG. 5b).

Figure 5C:
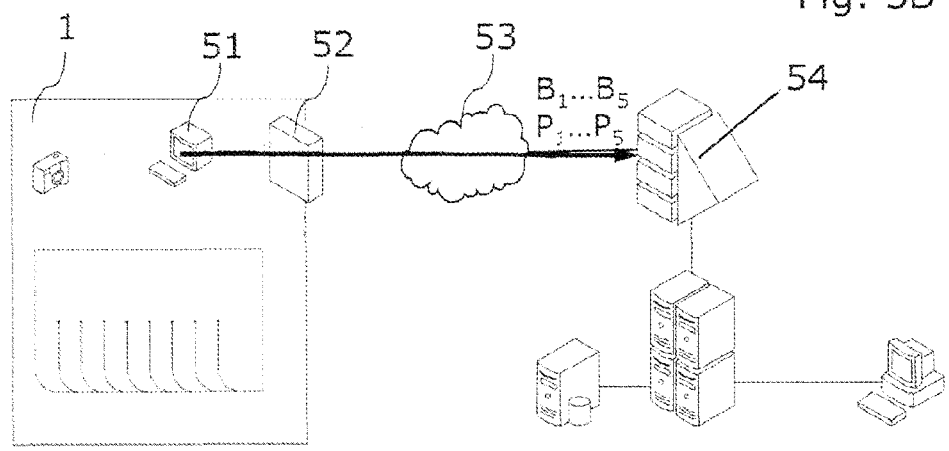

The images $B_1$ to $B_5$ of the cut edges $41_1$ to $41_5$ including the associated meta data are transmitted by the machine operating processor 51 via a telepresence interface 52 via a secure internet connection 53 with specific service recognition (ID Cause) to a telepresence portal 54 of the machine tool manufacturer (FIG. 5c).

Figure 5D:
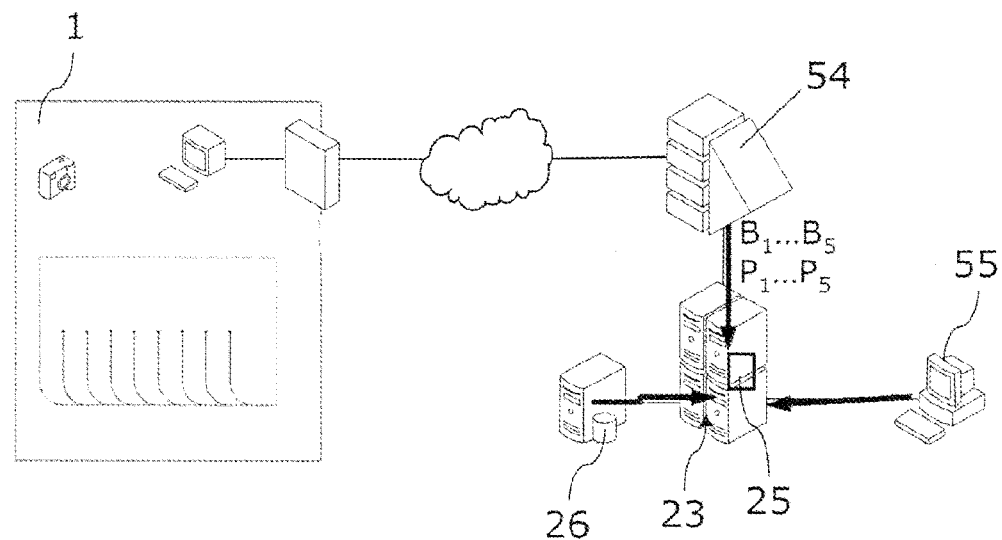

Via the specific service recognition, it is identified in the telepresence portal 54 that there is a request for cutting parameter optimization. The telepresence portal 54 verifies whether authorization for the use of the cutting parameter optimization is present and grants this where applicable. Afterwards, the images $B_1$ to $B_5$ of the cut edges $41_1$ to $41_5$ including the associated meta data are transmitted to a dialogue system (technology assistant) 23 incorporated in the telepresence portal 54 (FIG. 5d). The dialogue system 23 forms together with the proposal module 25 and the data bank 26 thereof a central expert system of the machine tool manufacturer.

Figure 5E:
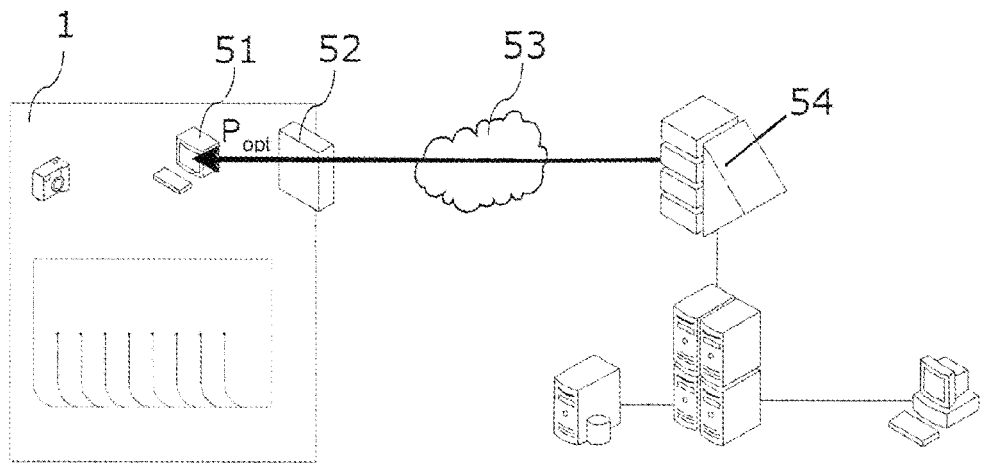

The expert or dialogue system 23 establishes from the respective images $B_1$ to $B_5$ of the cutting edges $41_1$ to $41_5$ and the associated metadata the optimal cutting parameter $P_{opt}$ or optionally other cutting parameters for another test cut metal sheet. This can be carried out by means of control systems, data banks and image analysis by a person at a screen workplace 55. The expert or dialogue system 23 transmits the established optimal cutting parameter $P_{opt}$ or the established additional cutting parameters via the telepresence portal 54 and via the secure internet connection 53 to the telepresence interface 52 and back to the machine operating processor 51 (FIG. 5e). On the machine operating processor 51, the machine operator can now take up the established optimal cutting parameter $P_{opt}$ or produce another test cut metal sheet.

Owing to this "Online cutting parameter optimization", the cutting parameters of the laser cutting machine can be optimized in situ without expert knowledge. This also works with materials with fluctuating quality and with previously non-established materials. The transmitted cutting parameters including associated material and processing data can be stored centrally in the expert system and used to further improve the expert system. The most up-to-date knowledge of the machine tool manufacturer is always available to the machine operator via the central expert system. The method described can also be used for other cutting technologies (for example, water jet cutting).

A number of implementations of the invention have been described. Nevertheless, it will be understood that various modifications may be made without departing from the spirit and scope of the invention. Accordingly, other implementations are within the scope of the following claims.

What is claimed is:

1. A dialogue system for the examination of a laser cutting operation which is carried out on a laser machine tool to establish a proposal for improving at least one quality feature of a subsequent laser cutting operation, the dialogue system comprising:
   input means through which an operator can identify the quality feature that is to be improved; and
   a proposal module that is configured to access stored expert knowledge, and to provide at least one proposal for improving the quality feature, wherein, to provide the at least one proposal, the proposal module is further configured to read data provided from a sensor system of the laser machine tool and image data of at least one laser cut edge of a processed metal sheet together with associated metal sheet material and processing data.

2. The dialogue system according to claim 1, wherein the dialogue system is further configured to request additional operator inputs and to process the additional operator inputs together with the one or more of the data provided from the laser machine tool sensor system and the image data of at least one laser cut edge of the processed metal sheet together with the associated metal sheet material and processing data in order to establish the proposal.

3. The dialogue system according to claim 1, wherein the dialogue system is further configured to initiate one or more of a laser cutting operation and a measurement by the laser machine tool sensor system.

4. The dialogue system according to claim 1, further comprising a mask generator that produces masks for one or more of input requests and output of established proposals.

5. The dialogue system according to claim 1, wherein the stored expert knowledge has a tree-like data structure with hierarchical decision nodes which the proposal module can access in order to establish a proposal.

6. The dialogue system according to claim 1, wherein the stored expert knowledge comprises an XML data bank that has a plurality of individual data elements which define decision nodes.

7. The dialogue system according to claim 1, wherein the stored expert knowledge can be modified by an operator, such that additional decision nodes can be one or more of supplemented and inserted by an operator.

8. The dialogue system according to claim 1, wherein at least one decision node of the stored expert knowledge is defined such that the proposal module makes a decision at least based on one or more of data provided by the laser sensor system and the image data of at least one laser cut edge of the processed metal sheet together with associated metal sheet material and processing data.

9. The dialogue system according to claim 1, wherein at least one decision node of the stored expert knowledge is defined such that the proposal module at the decision node makes a decision at least based on an operator input.

10. The dialogue system according to claim 1, wherein at least one decision node of the stored expert knowledge is defined such that the proposal module at the decision node makes a decision at least based on data from a control program of the laser cutting operation which is carried out.

11. The dialogue system according to claim 1, wherein the stored expert knowledge has a tree-like data structure which defines at least one path for establishing a proposal, which has one or more of at least one sensor data decision node, at least one operator input decision node, and at least one processing program data decision node.

12. The dialogue system according to claim 1, wherein the stored expert knowledge is stored in a central data bank which is incorporated in a telepresence portal.

13. The dialogue system according to claim 1, wherein the proposal module is further configured to read one or more of data provided from a machine tool sensor system and image data of a plurality of laser cut edges of the processed metal sheet together with the associated metal sheet material and processing data in order to establish the proposal.

14. A control unit for a laser machine tool, the control unit having a dialogue system for examining a laser cutting operation which is carried out on the laser machine tool to establish a proposal for improving at least one quality feature of a subsequent laser cutting operation, the dialogue system comprising:
    input means through which an operator can identify the quality feature that is to be improved; and
    a proposal module that is configured to access stored expert knowledge, and to provide at least one proposal for improving the quality feature, wherein, to provide the at least one proposal, the proposal module is further configured to read data provided from a sensor system of the laser machine tool and image data of at least one laser cut edge of a processed metal sheet together with associated metal sheet material and processing data.

15. The control unit according to claim 14, wherein the control unit is constructed such that automatic adaptation of at least one control program of the subsequent laser cutting operation can be carried out based on the proposal established for the subsequent laser cutting operation by means of the dialogue system.

16. A non-transitory computer-readable medium storing a computer program product that is executable on a data processing system and comprising encoding that is executable to form a dialogue system for examining a processing operation which is carried out on a laser machine tool to establish a proposal for improving at least one quality feature of a subsequent laser cutting operation, the dialogue system comprising:
    input means through which an operator can identify the quality feature that is to be improved; and
    a proposal module that is configured to access stored expert knowledge, and to provide at least one proposal for improving the quality feature, wherein, to provide the at least one proposal, the proposal module is further configured to read data provided from a sensor system of the laser machine tool and image data of at least one laser cut edge of a processed metal sheet together with associated metal sheet material and processing data.

17. A laser machine tool implemented method for examination of a processing operation to establish a proposal for improving at least one quality feature of a subsequent laser cutting operation in which an operator predetermines a quality feature for a dialogue system, the method comprising:
    establishing, by the dialogue system, at least one proposal for improving the quality feature using stored expert knowledge; and
    reading, by the dialogue system, data provided by a sensor system of the laser machine tool and image data of at least one laser cut edge of a processed metal sheet together with associated metal sheet material and processing data in order to establish the proposal.

18. The method according to claim 17, further comprising transmitting the data provided by the laser machine tool sensor system, the image data of at least one laser cut edge and the associated metal sheet material and processing data to the dialogue system using a telepresence portal.

19. The method according to claim 17, further comprising:
    recording images of a plurality of cutting edges of the processed metal sheet cut with different cutting parameter data; and
    transmitting the images together with the associated metal sheet material and cutting parameter data of the processed metal sheet to the dialogue system.

* * * * *

UNITED STATES PATENT AND TRADEMARK OFFICE
CERTIFICATE OF CORRECTION

PATENT NO. : 9,529,343 B2  
APPLICATION NO. : 13/724189  
DATED : December 27, 2016  
INVENTOR(S) : Klaus Bauer, Gerhard Hammann and Hans-Peter Bock Page 1 of 1

It is certified that error appears in the above-identified patent and that said Letters Patent is hereby corrected as shown below:

On the Title Page

Column 1, Related U.S. Application Data item (63), Line 2, delete "PCT/DE2011/060821," and Insert -- PCT/EP2011/060821, --

Signed and Sealed this  
Seventeenth Day of November, 2020

Andrei Iancu  
*Director of the United States Patent and Trademark Office*